US009255537B2

(12) United States Patent
Kim et al.

(10) Patent No.: US 9,255,537 B2
(45) Date of Patent: Feb. 9, 2016

(54) REJUVENATION CONTROL OF PALLADIUM-ONLY DIESEL OXIDATION CATALYST

(71) Applicant: GM GLOBAL TECHNOLOGY OPERATIONS LLC, Detroit, MI (US)

(72) Inventors: Chang H. Kim, Rochester, MI (US); Michelle H. Wiebenga, Berkley, MI (US); Eugene V. Gonze, Pinckney, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 229 days.

(21) Appl. No.: 13/834,411

(22) Filed: Mar. 15, 2013

(65) Prior Publication Data

US 2014/0278003 A1 Sep. 18, 2014

(51) Int. Cl.
  F02D 41/14 (2006.01)
  F02D 41/02 (2006.01)
  F01N 3/10 (2006.01)

(52) U.S. Cl.
  CPC .......... F02D 41/1446 (2013.01); F02D 41/027 (2013.01); F02D 41/1445 (2013.01); F02D 41/1456 (2013.01); F02D 41/1475 (2013.01); F01N 3/103 (2013.01); F02D 41/1438 (2013.01); F02D 41/1439 (2013.01); Y02T 10/47 (2013.01)

(58) Field of Classification Search
  CPC .................... F02D 41/1445; F02D 41/1446
  USPC .................... 60/274, 285, 286, 299–303
  See application file for complete search history.

(56) References Cited

U.S. PATENT DOCUMENTS

| 5,208,204 A | * | 5/1993 | Subramanian et al. | ....... 502/303 |
| 6,021,638 A | * | 2/2000 | Hochmuth | ...................... 60/274 |
| 2004/0159097 A1 | * | 8/2004 | Uematsu et al. | ................ 60/286 |
| 2008/0202100 A1 | * | 8/2008 | Komatsu et al. | ................ 60/285 |
| 2013/0019589 A1 | | 1/2013 | Kim et al. | |

OTHER PUBLICATIONS

T. Maillet, C. Solleau, Jacques Barbier Jr., Daniel Duprez, Oxidation of carbon monoxide, propene, propane and methane over a Pd/Al2O3 catalyst. Effect of the chemical state of Pd, Applied Catalysis B: Environmental, vol. 14, Issues 1-2, Dec. 5, 1997, pp. 85-95, ISSN 0926-3373, http://dx.doi.org/10.1016/S0926-3373(97)00014-3.*

\* cited by examiner

*Primary Examiner* — Stephen K Cronin
*Assistant Examiner* — Kevin R Steckbauer
(74) *Attorney, Agent, or Firm* — Reising Ethington P.C.

(57) ABSTRACT

A palladium-only (i.e., platinum free) oxidation catalyst body is used to oxidize carbon monoxide and hydrocarbons in the exhaust stream of a diesel engine powered vehicle, which is operated at a fuel-lean air-to-fuel ratio (A/F) for much of the time it powers a vehicle. Periodically, a recent history of the temperatures of the exhaust gas at the inlet to the palladium oxidation catalyst body is prepared in a computer control module. And a recent history of the A/F of the operating engine is considered. These temperature and A/F values are then used in determining whether the engine should be temporarily operated in a fuel-rich or stoichiometric A/F mode to provide an exhaust gas composition suitable for rejuvenation of the palladium by reducing its oxide formed during lean operation of the engine.

10 Claims, 2 Drawing Sheets

REJUVENATION CONTROL OF PALLADIUM-ONLY DIESEL OXIDATION CATALYST

TECHNICAL FIELD

This invention pertains to the use of an alumina-supported palladium catalyst to promote the oxidation of carbon monoxide (CO) and unburned hydrocarbons (HC) in the oxygen-containing exhaust of a diesel engine powered vehicle or other lean-burn engine vehicle. More specifically, this invention pertains to the operation and rejuvenation of such a diesel oxidation catalyst (DOC) so that no platinum is required in the palladium catalytic reactor used for the oxidation of these exhaust constituents.

BACKGROUND OF THE INVENTION

It has been necessary to employ exhaust gas flow-through catalyzed reactors for the conversion of carbon monoxide (CO), unburned hydrocarbons (e.g., propylene), and nitrogen oxides (NOx) in the exhaust gas stream flowing from, for example, gasoline-fueled, spark-ignited engines and diesel-fueled, compression-ignited engines that power automotive vehicles.

In the case of gasoline-fueled engines that are operated at close to the stoichiometric air-to-fuel mass ratio (e.g., about 14.5/1), a three-way catalyst, typically comprising platinum and/or palladium particles, carried and supported on alumina particles, has been effective in simultaneously oxidizing carbon monoxide to carbon dioxide, oxidizing residual hydrocarbons (HC) to carbon dioxide and water, and reducing NOx constituents (NO and $NO_2$) to nitrogen and water. The exhaust gas, driven by the piston action of the reciprocating engine, flows through an extruded, monolithic, catalyst support body formed with many small, parallel, flow-through channels (e.g., 400 per square inch of inlet area) extending from an inlet face to an outlet face of the catalyst-support body. The walls of the many channels are suitably coated with a thin washcoat layer of the alumina-supported platinum-group metal catalyst particles. The relatively low oxygen content of the exhaust from the gasoline engine, operated in a stoichiometric air/fuel ratio combustion mode, typically permits the three-way conversion of CO, HC, and NOx during passage of the exhaust through a single catalyst body.

The exhaust stream flowing from a diesel-fueled engine or a gasoline engine operated in a lean-burn mode (A/F=14.6/1 or higher) typically contains about eight to ten percent by volume of oxygen and a like proportion of water. The temperature of the exhaust may vary from about 150° C. to about 500° C. depending on time of engine operation, current engine loading, and other variable engine operating conditions.

Compared with engines operated in a stoichiometric A/F mode, the lean-burn exhaust stream still contains small amounts of CO and HC, and it contains larger amounts of the NOx constituents. Each of these constituents must be converted in the exhaust to carbon dioxide, nitrogen, and water. And no single catalyst body has been devised to accomplish such conversions.

Different combinations of catalyst treatments have been proposed for the treatment of diesel exhausts. While a diesel engine is generally operated at a high A/F ratio (greater than 14.6/1) there are periods during cold start, heavy loading, or other driving situations in which the engine is briefly operated at close to stoichiometric A/F ratio, or even slightly fuel-rich (A/F about 14/1). The exhaust system must be devised to accommodate such engine operating modes. One system uses three or more catalytic reactors located in a progressive flow arrangement in the exhaust system, extending from the exhaust manifold of the diesel engine under the truck cab or passenger vehicle body, and extending to an outlet at which the treated exhaust is discharged to the ambient atmosphere. In this exemplary system, the exhaust gas flows sequentially through (i) a platinum and palladium-containing oxidation catalyst (DOC) for oxidation of CO and some HC, (ii) a lean NOx trap for storage of NOx during fuel-lean operation, and (iii) a selective catalytic reduction reactor (SCR) using ammonia as the reductant for NOx. An aqueous solution of urea is injected into the hot exhaust stream just upstream of the SCR reactor to provide ammonia for the catalyzed reduction reaction.

There is a need to reduce the costs of this complex exhaust treatment system for fuel-lean NOx containing exhausts. And one critical cost has been the use of platinum in the DOC. An alumina supported, platinum particle-containing catalyst has proven effective in the oxidation of CO and HC in diesel exhaust containing eight volume percent oxygen despite the wide temperature range (150° C. and higher) of exhaust temperatures produced during diesel engine operation. Palladium is much less expensive than platinum and is as active as platinum for CO and HC oxidation. But palladium tends to lose its activity to oxidize the CO and HC at lower exhaust temperatures (lower than 250° C.) after prolonged exposure to oxygen-containing exhaust at lean exhaust temperatures above about 300° C. It would be useful, and less expensive, to have a way to maintain the oxidation efficiency of a palladium-only DOC catalyst.

SUMMARY OF THE INVENTION

The exhaust gas from a diesel engine contains nitrogen and oxygen (from the air charged to the engine) as well as by-products from combustion of the hydrocarbon diesel fuel. These by-products include: water, carbon monoxide (CO), carbon dioxide ($CO_2$), unburned hydrocarbons (HC), nitric oxide (NO) and nitrogen dioxide ($NO_2$). The nitrogen oxides are referred to collectively as NOx, with NO being the predominant constituent of the mixture. The exhaust gas also contains carbon particles which must also be removed from a diesel exhaust, but are not the focus of this invention.

In their work leading to the development of this invention, the inventors tested alumina-supported, palladium catalysts using a synthetic exhaust gas comprising by volume, 260 ppm propylene ($C_3H_6$), 200 ppm NO, 8% oxygen, 8% water, and the balance nitrogen. CO was not included in the synthetic exhaust stream because CO is readily oxidized before the HC content is oxidized as the exhaust gas flows in contact with a palladium oxidation catalyst. Practices of this invention are based on the inventors' study of the cumulative effect of this representative diesel exhaust composition on different loadings of alumina-supported, palladium-only catalysts applied as a wash coat on the flow-through channel walls of an extruded cordierite monolith body.

An initial common practice was to initially age the alumina-supported palladium catalyst by heating it in air, containing ten volume-percent water, at 750° C. for 72 hours. The synthetic exhaust gas was then passed through the aged palladium-washcoated channels of the monolith body and the gas temperature was gradually increased from 100° C. to 300° C. The composition of the gas exiting the monolith was analyzed using a Fourier Transform Infrared (FTIR) analyzer to determine the performance of the palladium catalyst in oxidizing propylene. It was found that the temperature at which 50% of the propylene was converted to carbon dioxide and water ($T_{50}$) was 251° C. Increasing the palladium loading in like application provided only a small reduction in $T_{50}$ for propylene conversion. The inventors concluded that the palladium was in its oxide form and, as such, required relatively high exhaust gas temperatures for conversion of HC in a diesel exhaust stream.

As will be described in more detail below in this specification, the inventors demonstrated that the ($T_{50}$) for hydrocarbon oxidation was reduced significantly when the aged palladium (oxide) catalyst was chemically reduced at 225° C. in a synthetic gas stream comprising 5% hydrogen in helium. The inventors recognized that diesel exhaust gas produced during periodic diesel engine operation at stoichiometric A/F ratios could be employed to reduce an oxidized, palladium oxidation catalyst to restore its lower temperature activity and effectiveness in HC oxidation in a lean diesel exhaust.

Accordingly, the following method of diesel engine operation and management of the exhaust flow in a palladium-only DOC is to be followed. In this method the diesel exhaust is first passed through the alumina-supported palladium oxidation catalyst for oxidation of CO and HC and then passed through downstream catalytic reactors to accomplish (for example) NOx storage or trapping, ammonia selective catalytic reduction (SCR) of NOx, and filtration, storage and burn-off of diesel particulates.

Practices of this invention are applicable to alumina-supported palladium DOC reactors placed in the exhaust treatment systems for vehicles powered by diesel or lean-burn-gasoline engines. Typically, a flow-through monolithic DOC reactor, bearing a washcoat of the palladium catalyst, will be located to receive the exhaust stream as it leaves the exhaust manifold of the diesel engine. Modern vehicles use computer-based control modules to manage engine operation in combination with the treatment of the engine exhaust. Such control modules, and their associated instrumentation, may be used in diagnosing palladium catalyzed DOC performance and managing engine operation to enable good usage of a reduced-cost, palladium-only DOC.

The following DOC diagnosis and operating management practices are repeated periodically during vehicle operation. The frequency of the periods may be reduced when the engine is operated in a steady-state operating mode, such as during relatively constant vehicle load and speed. And the frequency of DOC evaluations may be increased during periods of variable engine operation, particularly during periods following a cold start of the engine and during periods in which the engine is operated such that the exhaust gas experiences alternating high and low temperatures (e.g., above and below 300° C.). In general, the controller may be operated to continually monitor the A/F ratio and the inlet temperature of the oxidation reactor during many periods of engine operation.

Recent and current temperatures of the exhaust stream entering the Pd-oxidation reactor (herein, $T_{DOCin}$) are continually measured and temporarily stored for reference by the computer-based control system. The recent and current engine A/F ratio combustion mode as evidenced in the exhaust composition is also determined and stored for use in this control process. During periods of engine fuel-rich operation, or of stoichiometric air-to-fuel ratio operation, the exhaust gas will be providing a reducing composition (comprising relatively low oxygen and higher HC content) with respect to palladium oxide content in the oxidation catalyst. In this low A/F diesel exhaust stream composition, the palladium catalyst will become more active and oxidize the CO and HC, even at low exhaust temperatures, e.g., below 250° C.

More critically, during periods of fuel lean engine operation (A/F=17 or greater), the $T_{DOC\,in}$ is also measured. When the current $T_{DOC\,in}$ value of the exhaust is higher than about 250° C., the palladium DOC is considered capable of oxidizing CO and HC at this temperature level and the present diagnosis cycle is completed.

But when the current exhaust gas temperature is low and $T_{DOC\,in}$ is less than 250° C., the recent $T_{DOC\,in}$ history is consulted in the control module to see if the DOC has been recently exposed to a temperature greater than, for example, 300° C. If the answer is "yes", then in this specific combination of $T_{DOC\,in}$ experiences, it is assumed that the palladium catalyst has been oxidized. A command is then issued by the engine control module to soon produce a "rich" or "stoichiometric" engine operation mode for a period of thirty seconds or so (e.g., ten to sixty seconds) to "rejuvenate" the palladium catalyst by reduction of palladium oxide to palladium. A specific time for such rejuvenation may be determined for each combination of engine and oxidation catalyst body, based on their performance experience. The palladium catalyst diagnosis and rejuvenation method of this invention may be repeated at time intervals determined in the programming of the engine control module and based on operating experience. But when the engine is producing continually variable exhaust temperatures and air-to fuel ratios, it is prudent to continually repeat the testing after relatively short periods of engine operation.

Thus, an easily performed computer module method is provided for continually assessing and, when necessary, rejuvenating for continued use a relatively inexpensive palladium-only DOC in the treatment of diesel exhaust gas and the exhaust from a gasoline engine operated in a fuel-lean mode.

The abbreviation "DOC" commonly refers to a body of diesel oxidation catalyst. However, the practices of this invention are applicable to the maintenance and rejuvenation of a palladium-only oxidation catalyst (OC or DOC) whether it is used in a diesel-fueled engine or a gasoline-fueled engine that is operated in a lean-burn mode. Likewise, the abbreviations $T_{DOCin}$ and $T_{OCin}$ may be used interchangeably, without the intent of limiting their use to application to a diesel-fueled engine or to a lean-burn gasoline-fueled engine.

Other objects and advantages of the invention will be apparent from the following detailed description of the invention with reference to the illustrative drawings.

BRIEF DESCRIPTION OF THE DRAWINGS

FIG. 2 also illustrates, schematically, the use of A/F ratio and temperature instrumentation and a computer-based engine control and exhaust stream control module for assessing and maintaining the oxidation activity of the palladium oxidation catalyst.

DESCRIPTION OF PREFERRED EMBODIMENTS

Figure 1:
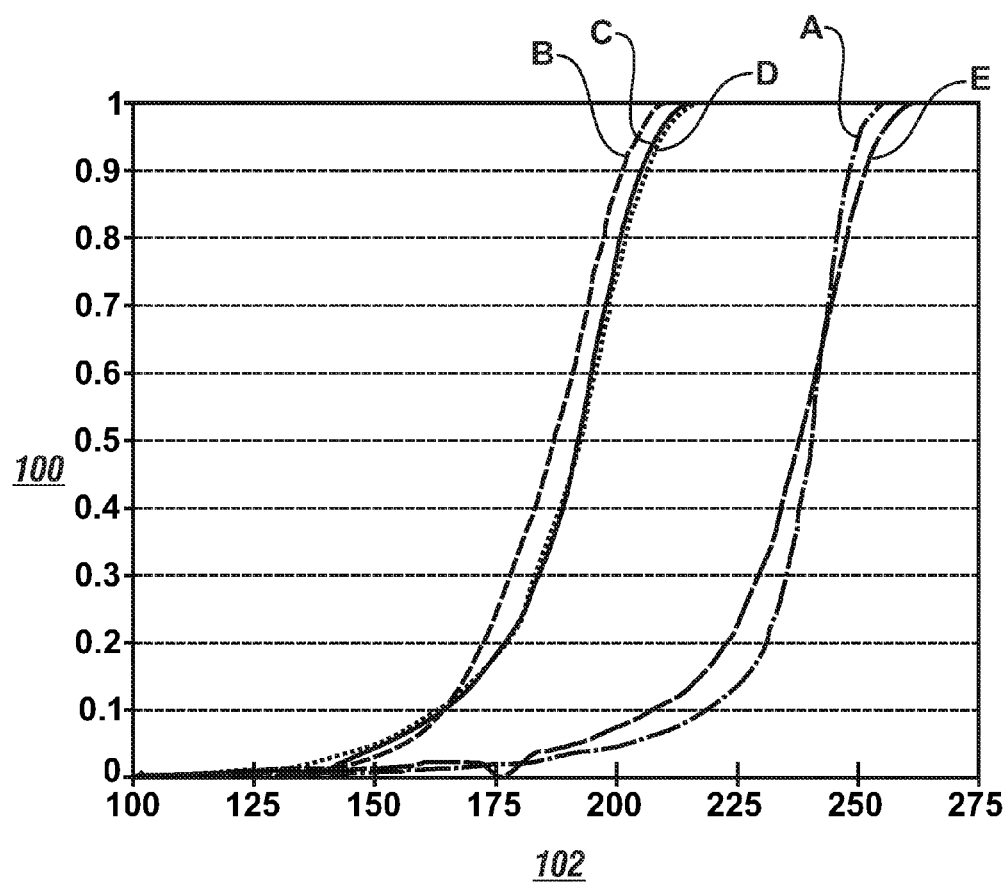
FIG. 1 is a graph of the normalized conversion proportion (100) of propylene in simulated diesel exhaust streams versus the inlet temperature (102), $T_{in}$, in degrees Celsius, of the stream flowing through Pd/Al$_2$O$_3$ washcoated passages of an extruded cordierite monolithic catalyst support body. The cordierite support body was extruded with 400 passages per square inch of inlet face area and then loaded with fifty grams of the washcoated palladium oxidation catalyst per cubic foot of the outside volume of the round cylindrical body. The simulated diesel exhaust gas stream consisted, by volume, of 260 ppm propylene ($C_3H_6$), 200 ppm NO, 8% oxygen, 8% water, and the balance nitrogen. The gas stream was progressively heated to obtain propylene conversion values at temperatures from about 100° C. until reaching a temperature at which substantially full conversion was attained. Conversion curves A and E were obtained when the palladium catalyst had been exposed to air at a temperature of 450° C. or higher. Conversion curves B, C, and D were obtained after the palladium catalyst had been treated with a flowing gas mixture consisting, by volume, of 260 ppm propylene, 1% oxygen, and 200 ppm NO in nitrogen.

This invention provides a method of assessing and maintaining the capacity of a palladium catalyst for the oxidation of carbon monoxide and hydrocarbons in the exhaust stream flowing from a vehicle engine that is typically operated in a fuel-lean mode of combustion operation. Combustible mixtures of air and diesel fuel or of air and gasoline are delivered to combustion cylinders of the engine at an air-to-fuel mass ratio (A/F) under control of a computer-based engine and exhaust stream control system. In most of its various modes of operation, the engine is controlled to operate at an A/F that is fuel-lean (often higher than 14.6/1) to obtain the benefit of markedly improved fuel economy. But there are periods of engine operation in which the mixture of fuel and air are controlled at a stoichiometric or fuel-rich A/F (e.g., 14.4/1 to about 14/1). These periods of lower A/F may occur, for example, during engine warm-up, during periods of hill climbing or other relatively high engine loading, and on other engine control, programmed occasions in which it is desired to operate near to a stoichiometric air-to-fuel ratio.

The exhaust gases from the cylinders are combined into an exhaust stream comprising carbon monoxide (CO), incompletely burned hydrocarbons (HC, with propylene being representative), and nitrogen oxides (NOx), the exhaust stream then initially flowing into and through an oxidation catalyst support body having exhaust flow passages coated with an oxidation catalyst. The purpose of the oxidation catalyst is to convert carbon monoxide to carbon dioxide and residual hydrocarbons to carbon dioxide and water. The exhaust gas still contains NOx and so the exhaust stream is then directed through one or more additional treatment bodies for further treatment of the exhaust gas. For example, a flow through, monolithic, NOx storage body (sometimes called a NOx trap) may be used to absorb and temporarily store NOx during fuel-lean periods of engine operation and to release NOx back into the exhaust stream during stoichiometric engine operation. Subsequent to the NOx storage body, an aqueous solution of urea may be injected into the exhaust stream. The urea decomposes into ammonia in the hot exhaust stream, and the ammonia is used in a further down-stream catalyst body for the reduction of NOx to nitrogen and water. This practice of reducing NOx is called ammonia-selective catalytic reduction $NH_3$—SCR) of NOx. There are other suitable practices for the reduction of NOx, but the subject Pd oxidation catalyst works well in combination with $NH_3$—SCR practices for the conversion of NOx.

Further treatment of the exhaust typically comprised filtration of diesel particulates and their destruction by burning.

In accordance with practices of this invention, the object is to maintain and utilize palladium (free of platinum) as the oxidation catalyst encountered by the exhaust stream as it exits a diesel engine or lean-burn gasoline engine. Typically, and preferably, the palladium catalyst is prepared as nano-sized particles of palladium deposited and supported on particles of alumina providing high surface area to accommodate and disperse the palladium particles. In general, it is preferred to apply alumina-supported palladium catalyst particles as a washcoat on the wall surfaces of the channels in an extruded monolithic support body. This body may be formed of a ceramic material, such as cordierite, or of a suitable metal, capable of tolerating exhaust temperatures in the range of 100° C. to about 500° C. The catalyst support body is typically formed as a cylinder with a round or elliptical cross-section and with parallel, transverse, inlet and outlet faces for the exhaust flow. The support body typically has 400 or more channels per square inch of inlet face area. The washcoated body is in turn supported in a stainless steel container with an inlet and outlet to direct the flow of the exhaust stream through the channels of the support body into intimate contact with the thin layers of washcoat-applied palladium oxidation catalyst particles.

We have carefully studied the performance of Pd/alumina catalysts (from a catalyst manufacturer) in synthetic exhaust gas streams that are representative of the exhaust from a diesel engine operating in its fuel-lean mode. The catalysts were alumina-supported palladium particles applied as a washcoat to small round cordierite bodies with flow-through channels. The loading was fifty grams of palladium per cubic foot of the outside volume of the cordierite bodies.

An initial common practice was to initially age the alumina-supported palladium catalyst by heating the washcoated cordierite body in air, the air containing ten volume-percent water, at 750° C. for 72 hours.

The aged palladium-washcoated monolith body was placed in an open-ended tubular furnace, and the synthetic exhaust gas was passed through the channels of the heated body at a space velocity (SV) of 30,000 $h^{-1}$. The exhaust gas temperature was gradually increased from 100° C. to 300° C. at a rate of 2° C./min. The composition of the gas exiting the monolith was analyzed (FTIR) to determine the performance of the palladium catalyst in oxidizing propylene as a representative hydrocarbon in the exhaust. It was found that the temperature at which 50% of the propylene was converted to carbon dioxide and water ($T_{50}$) was 251° C. Increasing the palladium loading in like application to the cordierite bodies provided only a small reduction in $T_{50}$ for propylene conversion. It was concluded that the palladium was in its oxide form and, as such, required relatively high exhaust gas temperatures for conversion of HC in a diesel exhaust stream.

A series of tests were then conducted with the results illustrated in the graph of FIG. 1. FIG. 1 is a graph of the normalized conversion proportion 100 of propylene in simulated diesel exhaust streams versus the inlet temperature 102, $T_{in}$, in degrees Celsius, of the stream flowing through Pd/$Al_2O_3$ washcoated passages of an extruded cordierite monolithic catalyst support body. The cordierite support body was formed with 400 passages per square inch of inlet face area and loaded with fifty grams of the washcoated palladium oxidation catalyst per cubic foot of the outside volume of the round cylindrical body. The palladium oxidation catalyst body was then aged for 72 hours in air (10% water) at 750° C.

The simulated diesel exhaust gas stream consisted, by volume, of 260 ppm propylene ($C_3H_6$), 200 ppm NO, 8% oxygen, 8% water, and the balance nitrogen. A Pd—$Al_2O_3$ washcoated body was placed in the tubular oven and gradually heated from 100° C. to about 300° C. and the synthetic gas stream was passed through the catalyst body at a SV of 30,000 $h^{-1}$. The gas stream exiting the catalyst body was continually analyzed using a FTIR analyzer and the proportionate conversion (100 in FIG. 1) of propylene to carbon dioxide and water calculated, where 0 represents no conversion and 1 represents total conversion. Conversion curve A in FIG. 1 illustrates that the 0.5 conversion (50%) occurred at a temperature of about 240° C. (sometimes called $T_{50}$). The data of conversion curve A demonstrates that the aged-in-humid-air palladium sample is capable of fully oxidizing HC at temperatures above about 250° C., but less effective at lower temperatures often experienced in the treatment of diesel exhaust. It is to be recognized that such aging of the palladium catalyst likely converted some or much of the palladium to one or more of its oxides.

In accordance with our experience described in the Summary section of this specification, it was decided to subject the palladium catalyst body (used in the Conversion curve A test) to contact with a flow of gas prepared to simulate that of a diesel engine operating at about a stoichiometric air-to-fuel ratio. A synthetic gas stream consisting, by volume, of 260 ppm propylene, 1% oxygen, 200 ppm NO, and the balance nitrogen was passed through the channels of the cordierite body at a temperature of 450° C. and a SV of 30,000 $h^{-1}$ for a period of one hour. This practice was done for the purpose of reducing much of the oxide content of the palladium. Subsequent testing has shown that the rejuvenation may be accomplished in a much shorter period of time, such as in a period of ten to sixty seconds.

The thus-processed Pd-washcoated cordierite body was again exposed to the synthetic lean diesel exhaust as used in obtaining the data of conversion curve A. Propylene conversion curves B, C, and D were obtained in three successive, substantially identical tests, in which the Pd-cordierite body was heated in the furnace with the simulated diesel exhaust gas stream consisting of 260 ppm propylene ($C_3H_6$), 200 ppm NO, 8% oxygen, 8% water, and the balance nitrogen. In each of these B, C, and D tests the catalyst was not heated substantially above 200° C. and demonstrated very good low temperature oxidation conversion activity for the propylene.

Finally, the same Pd oxidation body was again exposed to oxygen and water at high temperature. The body was exposed to a stream consisting, by volume, of 20% oxygen, 10% water, and the balance nitrogen for two hours at 450° C. This was intended to duplicate the effect on the catalyst of prolonged exposure to lean diesel exhaust at temperatures well above, e.g., 300° C. The catalyst was again exposed to the lean diesel exhaust stream under the above described conditions. The propylene conversion data is presented in conversion curve E. It is seen that the oxidized Pd catalyst retains its oxidation capability at exhaust temperatures above 250° C., but has lost much of its lower temperature oxidation activity.

Figure 2:
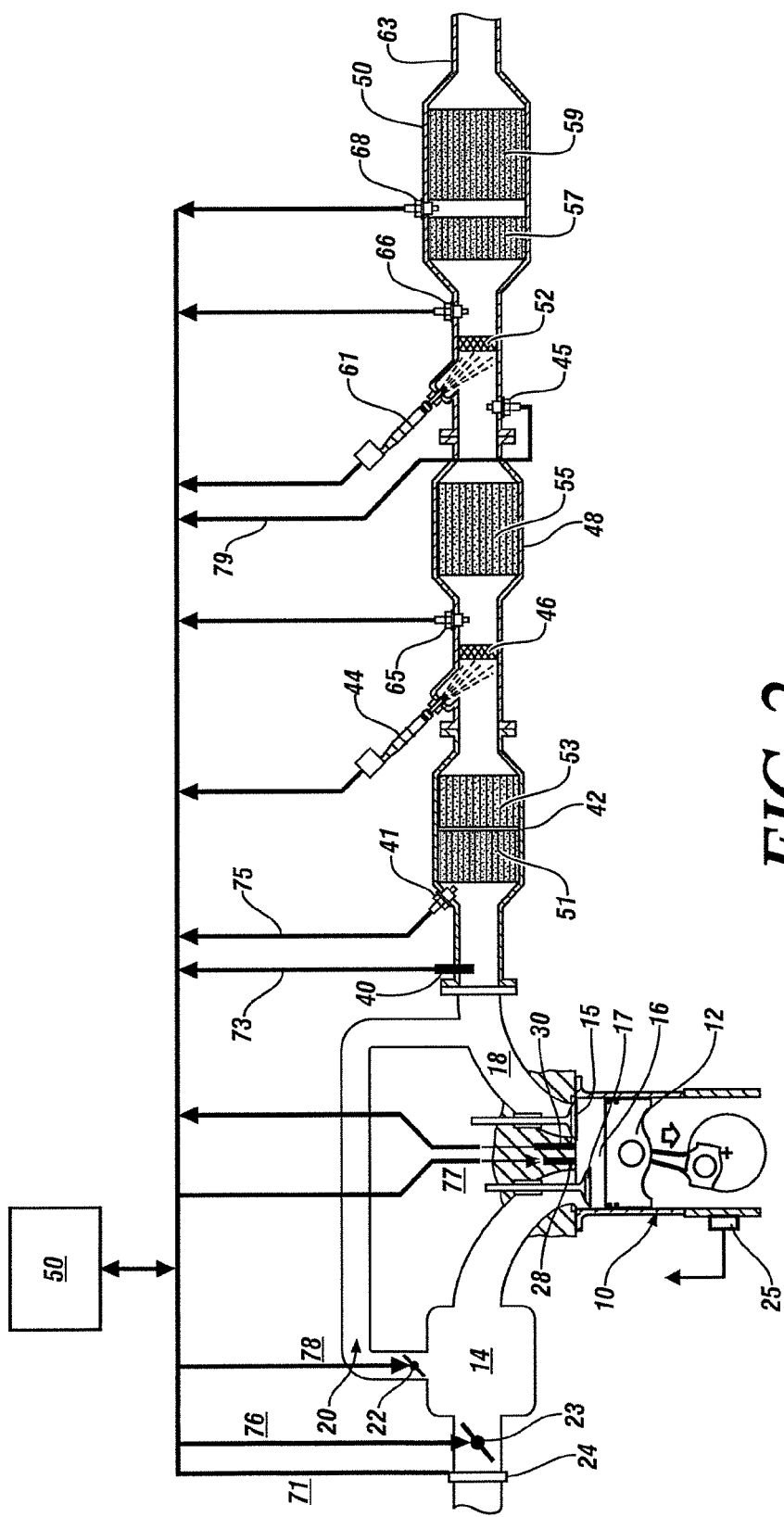
FIG. 2 schematically illustrates, partly in cross-section, a portion of a single cylinder of a compression-ignition internal combustion engine and an exhaust after-treatment system that includes a palladium-catalyzed oxidation reactor followed by commonly used, further exhaust gas treatment systems, especially for conversion of NOx.

Thus, we propose to adapt and use present automotive vehicle computer-based control systems, programmed for control and management of engine operation and exhaust gas treatment, to assess and maintain the oxidation capacity of alumina supported-palladium oxidation catalysts. Reference is now made to FIG. 2 for the purpose of further illustrating how computer-based engine operation controls and exhaust stream processing controls may be used in practices of this invention to periodically assess and maintain the capacity of a palladium-only oxidation catalyst to convert CO and HC constituents in the exhaust of a diesel engine or other lean-burn engine which is operated for short and long operating periods, at temperatures ranging from 100° C. to about 500° C., and at an A/F ratio well above the stoichiometric ratio during much of the time of engine operation.

FIG. 2 schematically illustrates a portion of a single cylinder 12 of a compression-ignition internal combustion engine 10 fluidly coupled through exhaust manifold 18 to a first flow-through exhaust reactor 42 containing a palladium-only oxidation monolithic convertor 51, and a NOx monolith absorber 53. A urea solution is then injected into the exhaust stream through urea injector 44. A flow-through ceramic mixer 46 induces mixing of the urea (which is converted to ammonia in the hot exhaust) with the exhaust stream. The exhaust gas then flows through an NOx reduction reactor 48 containing an ammonia-selective catalytic reduction ($NH_3$—SCR) monolith 55 where NOx is reduced to nitrogen and water. The exhaust stream then enters a third flow-through reactor 50 containing a second oxidation catalyst monolith reactor 57 which is employed in combination with a diesel particulate filter 59. The diesel particulate filter 59 removes carbon particulates from the stream, temporarily storing them on the filter body. From time-to-time fuel is injected (injector 61) into the often oxygen-rich exhaust stream (using mixer 52) to support burning of the trapped carbon particulates on filter 59, converting them to carbon dioxide and water. The multiply-treated exhaust then exits the end 63 of the exhaust system. Thus, the portions of the exhaust treatment system downstream complete the conversion of exhaust constituents somewhat independently of the Pd-oxidation catalyst, but the management of the Pd-catalyst must not inhibit downstream exhaust conversions of exhaust gas constituents.

The internal combustion engine 10 is configured to operate in a four-stroke compression-ignition combustion cycle, including repetitively executed intake-compression-ignition-exhaust strokes, or any other suitable combustion cycle. The internal combustion engine 10 preferably includes an intake manifold 14, combustion chamber 16, intake and exhaust valves 17 and 15, respectively, an exhaust manifold 18, and an exhaust gas recirculation (EGR) system 20 including an EGR valve 22 and its position sensor signal 78. The intake manifold 14 may include a mass airflow sensing device 24 that generates a signal output 71 corresponding to a mass flow rate of engine intake air. The intake manifold 14 optionally includes an air inlet throttle device 23 and signal 76 corresponds to the position of the throttle device. These signals are transmitted to a computer-based engine and exhaust treatment control system module 50 which continually receives and uses these signals, and many others, as described in the following text, in controlling engine operation and exhaust as treatment.

A fuel injector 28 is configured to directly inject a fuel pulse into the combustion chamber 16 in response to a pulse width command 77 received from control module 50. In one embodiment, one or more pressure sensor(s) 30 is configured to monitor in-cylinder pressure in one of, or preferably all of the cylinders of the engine 10 during each combustion cycle. A rotational position sensor 25 is configured to monitor rotational position and speed of a crankshaft of the engine 10. A single one of the cylinders 12 is depicted, but it is appreciated that the engine 10 includes a plurality of cylinders each having an associated combustion chamber 16, fuel injector 28, and intake and exhaust valves 17 and 15. The description of the engine 10 is illustrative, and the concepts described herein are not limited thereto. Although the internal combustion engine 10 is described as a compression-ignition internal combustion engine, it is appreciated that the concepts described herein may apply to other internal combustion engines configured to operate lean of stoichiometric A/F that may employ the palladium oxidation catalyst body 51 and a $NH_3$—SCR exhaust after treatment system comprising urea injector 44 and SCR monolith 55, as described herein.

An air/fuel ratio sensing device 40 and temperature sensing device 41 are configured to monitor an exhaust gas feed stream of the internal combustion engine 10, and preferably generates signal outputs including an air/fuel ratio signal 73 and an exhaust gas feed stream temperature signal 75. The A/F and temperature sensing device is located to measure the current A/F ratio of the engine based on the current exhaust gas composition and the exhaust stream temperature, both at the inlet to the palladium oxidation catalyst monolith body 51 [42]. Their respective A/F signal 73 and temperature inlet signal 75 are also delivered to and stored in the computer-based engine control and exhaust treatment control system module 50. Included in the functions of module 50 is the use of the A/F signal 73 and the oxidation catalyst inlet signal (sometimes $T_{DOC\,in}$) 75 to assess and maintain the function of the alumina-supported palladium oxidation catalyst monolith body 51.

Engine 10 and its control module 50 may utilize an additional A/F ratio sensing device (not illustrated in FIG. 2) in its management of operation of engine 10, but A/F sensing device 40 and $T_{DOC\,in}$ sensing device 41 may be used as a basis to assess and maintain the function of the alumina-supported palladium oxidation catalyst monolith body 51.

The exhaust manifold 18 channels the exhaust gas feed stream of the internal combustion engine 10 to the first flow-through exhaust reactor 42 and subsequently past the injector 44 for the urea solution, through the $NH_3$—SCR catalyst 55, and through the diesel particulate filter 59 before the treated exhaust stream leaves the tailpipe of the vehicle. A NOx sensing device 45 (with its signal 79 may be employed to monitor the exhaust stream downstream of the $NH_3$—SCR catalyst 55. Additional temperature sensors may be used to monitor the inlet temperature to the SCR catalyst (sensor 65) and manage the function of the diesel particulate filter 59. Temperature sensor 66 may be used to monitor the inlet temperature to the second DOC 57 and temperature sensor 68 may be used to monitor the inlet temperature of diesel particulate filter 59. These sensors or measuring instruments may send their signals to be read and utilized by the control module 50 for purposes of control and diagnostics.

The oxidation catalytic converter container 42 directs the engine exhaust gas flow through the passages of a suitable monolithic palladium oxidation catalyst element 51. Often this palladium oxidation catalyst element 51 is an extruded cordierite ceramic body with many parallel flow passages as described above in this specification.

The cordierite body is coated with a washcoat of alumina-supported-palladium to form oxidation catalyst body 51 that is capable of oxidizing HC and CO molecules in response to engine operating conditions, including current and recent history values of the air/fuel ratio signal 73 and the $T_{OC\,in}$ signal which are received in the engine control and exhaust treatment control module 50 for use in assessing and maintaining the capacity of the palladium-only oxidation catalyst body 51 for the oxidation of carbon monoxide and hydrocarbons in the exhaust stream leaving exhaust manifold 18 of engine 10.

The assessing and maintenance method is preferably practiced using the A/F signal 73 and temperature signal 75 in module 50 in accordance with the following method steps.

Periodically, during engine operation, and during the start of an oxidation catalyst diagnosis time period predetermined by the engine and exhaust stream control system 50, the temperature of the exhaust gas ($T_{OCin}$) is measured (signal 75) over a time period of a few seconds as the exhaust gas enters the oxidation catalyst support body 51 and these temperature signals are used by module 50. During the same diagnosis time, present A/F values and a recent history of A/F values (signals 73) since the last diagnosis period are also collected and used by the control module 50 as follows.

As a first step, a current A/F value is considered by the process conducted in control module 50. If the current A/F value is a stoichiometric value or fuel-rich value, the module simply terminates further consideration of the oxidation catalyst until the next oxidation catalyst evaluation period. Since the palladium catalyst experiencing the exhaust of stoichiometric or current A/F ratio is being exposed to an exhaust composition conducive to reducing palladium oxide molecules in the washcoat material, there is no need to proceed with a diagnosis of the oxidation catalyst. But, if the A/F value is fuel-lean the process conducted by the control system continues to the following step.

The current value of $T_{OCin}$ is now considered. If the current $T_{OCin}$ value is greater than a first predetermined temperature, such as about 250° C., further consideration of the oxidation catalyst condition may be terminated until the next oxidation catalyst evaluation period. Although the palladium catalyst is experiencing a fuel-lean A/F, the exhaust temperature is suitably high for the catalyst to continue oxidation of CO and HC, even if the catalyst contains some palladium oxide. But if the present $T_{OCin}$ value is less than 250° C. (or other suitable predetermined temperature) in a lean A/F exhaust, the process is continued to the following step.

The process conducted in module 50 now considers whether the palladium oxidation catalyst has been exposed to a $T_{OCin}$, during the specified recent history time period, which is greater than 300° C. or other selected second predetermined temperature. If the oxidation catalyst has not been exposed to 300° C. or other second predetermined temperature, the module terminates further consideration of the oxidation catalyst until the next oxidation catalyst evaluation period. It is assumed that the palladium catalyst has not been oxidized, but is continuing to provide its oxidizing activity. But if the catalyst has been exposed to a temperature above 300° C. (or so) in the lean A/F exhaust stream environment, the process must proceed to the following rejuvenation processing of the oxidized palladium catalyst.

The practice of the process has now led to the conclusion that the palladium catalyst has likely been previously oxidized and now has a reduced capability to provide suitable catalyst activity to the lean exhaust gas at its relatively low temperature (e.g., below about 250° C.). Accordingly, the engine control module acts to alter the engine operation mode from a fuel-lean A/F to a stoichiometric or fuel-rich A/F for a rejuvenation time period determined sufficient to use the exhaust stream to rejuvenate the palladium oxidation catalyst. In other words, for a period of ten to about sixty seconds, depending on the mass-flow rate through the oxidation reactor, the engine is operated to reduce the oxygen content of the exhaust stream, while briefly maintaining sufficient HC content to effectively reduce the palladium oxide content of the catalyst. The selected A/F and the duration of the brief reduction period for the PdO-containing catalyst is selected to suitably reduce its oxide content and rejuvenate or restore its activity to catalyze the oxidation of CO and HC at relatively low exhaust gas temperatures in a lean A/F exhaust stream.

The rejuvenation of the palladium catalyst ends the current assessment and maintenance period for the catalyst. But after a predetermined period of engine operation the diagnostic procedure is repeated. Such assessment and maintenance process may be repeated when the control module senses that the exhaust temperature has recently fallen below about 300° C. while the engine continues to be operated in a lean A/F mode.

Thus, preferred and illustrative practices of the invention have been disclosed. But these examples are not intended to limit the scope of the invention.

The invention claimed is:

1. A method of assessing and maintaining the capacity of a palladium catalyst as it is being used for the oxidation of carbon monoxide and hydrocarbons in the exhaust stream flowing from an operating diesel-fueled or lean-burn gasoline-fueled vehicle engine in which combustible mixtures of air and fuel are delivered to combustion cylinders of the engine at an air-to-fuel mass ratio (A/F) under control of a computer-based engine and exhaust stream control system which varies the mixture of fuel and air from a stoichiometric or fuel-rich A/F to an A/F that is fuel-lean, and exhaust gases from the cylinders are combined into an exhaust stream comprising carbon monoxide, hydrocarbons, nitrogen oxides, oxygen, and water; the exhaust stream then flowing first into and through an oxidation catalyst support body having exhaust flow passages coated with an oxidation catalyst consisting of particles of palladium, and oxidized palladium formed during exposure of the palladium to oxygen, on alumina support particles; the carbon monoxide and hydrocarbons in the exhaust gas being oxidized as the exhaust gas flows in contact with the palladium particles on alumina support particles; the exhaust gas then flowing through one or more additional treatment bodies for treatment of the nitrogen oxide content of the exhaust gas; the assessing and maintaining method comprising the following palladium oxidation catalyst assessment procedure:

periodically, during engine operation and during an oxidation catalyst assessment time period predetermined by the engine and exhaust stream control system, measuring the temperature of the exhaust gas over a time period as the exhaust gas enters the oxidation catalyst support body ($T_{OCin}$) and also determining and maintaining a record of A/F values over a predetermined time period of engine operation preceding the execution of each palladium oxidation catalyst assessment procedure, and using collected temperature and A/F values in the control system as follows:

(a) considering a current A/F value and, if it is a stoichiometric value or a fuel rich value, terminating further assessment of the oxidation catalyst until a time for the next palladium oxidation catalyst assessment procedure, but if the A/F value is fuel-lean continuing to step (b);

(b) considering the current value of $T_{OCin}$ and, if the current $T_{OCin}$ is greater than a first predetermined temperature, terminating further consideration of the oxidation catalyst until a time for the next palladium oxidation catalyst assessment procedure, but if the $T_{OCin}$ value is less than the first predetermined temperature continuing to step (c);

(c) considering whether the oxidation catalyst has been exposed to a $T_{OCin}$ during the specified time period that is greater than a second predetermined temperature and, if the oxidation catalyst has not been exposed to a temperature greater than the second predetermined temperature, terminating further assessment of the oxidation catalyst until a time for a next palladium oxidation catalyst assessment procedure, but if the catalyst has been exposed to a temperature greater than the second predetermined temperature continuing to step (d); and (d) using the engine control system to alter the engine operation mode from a fuel-lean A/F to a stoichiometric or fuel-rich A/F for a rejuvenation time period determined sufficient for the constituents of the exhaust stream to rejuvenate the palladium oxidation catalyst.

2. A method as stated in claim 1 in which the first predetermined temperature of step (b) is 250° C.

3. A method as stated in claim 1 in which the second predetermined temperature of step (c) is 300° C.

4. A method as stated in claim 1 in which engine operation is maintained in a stoichiometric or fuel-rich A/F for a rejuvenation time period of 10 to 60 seconds to rejuvenate the palladium oxidation catalyst.

5. A method as stated in claim 1 in which the oxidation catalyst assessment process is repeated during each hour of engine operation.

6. A method as stated in claim 1 in which A/F ratio values are accumulated for a period of ten minutes of engine operation prior to beginning each palladium oxidation catalyst assessment procedure.

7. A method as stated in claim 1 in which $T_{OCin}$ temperatures are continually measured and stored and the palladium oxidation catalyst assessment procedure is initiated and performed when a $T_{OCin}$ value of 250° C. or lower is measured following a predetermined time period of continuous $T_{OCin}$ values exceeding a predetermined assessment procedure initiation temperature.

8. A method as stated in claim 7 in which the predetermined time period is five minutes or more.

9. A method as stated in claim 7 in which the predetermined assessment procedure initiation temperature is 300° C. or higher.

10. A method as stated in claim 1 in which the palladium oxidation catalyst assessment procedure is initiated and performed continually during a fifteen minute period following a cold start of the engine.

* * * * *